United States Patent
Louys

Patent Number: 5,165,754
Date of Patent: Nov. 24, 1992

[54] HEADREST WITH CLOSED CELL CUSHION AND A COVERING HAVING AN AUTO FORMED SURFACE FILM AND OVERMOULDED UNDERLAYER

[75] Inventor: Francois Louys, Mandeure, France

[73] Assignee: CESA-Compagnie Europeenne de Sieges pour Automobiles, Levallois Perret, France

[21] Appl. No.: 761,545

[22] Filed: Sep. 18, 1991

[30] Foreign Application Priority Data

Sep. 19, 1990 [FR] France .................. 90 11573

[51] Int. Cl.$^5$ ............................... A47C 1/10
[52] U.S. Cl. ........................ 297/391; 297/DIG. 2; 5/643
[58] Field of Search ............... 297/218, 219, 220, 391, 297/396, 397, 399–410, DIG. 1, DIG. 2; 248/686, 118, 118.1, 118.3, 118.5, 302, 310, 311.2, 311.3, 312; 5/643, 636

[56] References Cited

U.S. PATENT DOCUMENTS

| | | | |
|---|---|---|---|
| 3,205,005 | 9/1965 | Brown | 297/410 |
| 3,865,433 | 2/1975 | Stafford | 297/488 |
| 3,941,418 | 3/1976 | Bernard | 297/DIG. 2 X |
| 4,738,809 | 4/1988 | Storch | 297/410 X |
| 4,776,048 | 10/1988 | Wilheim | |
| 4,779,929 | 10/1988 | Küchemann | 297/391 X |
| 4,880,275 | 11/1989 | Lanteri | 297/395 X |

FOREIGN PATENT DOCUMENTS

| | | |
|---|---|---|
| 024687 | 8/1979 | European Pat. Off. . |
| 341683 | 11/1988 | European Pat. Off. . |
| 2419433 | 6/1975 | Fed. Rep. of Germany . |
| 2726141 | 12/1978 | Fed. Rep. of Germany . |
| 2836579 | 5/1980 | Fed. Rep. of Germany . |
| 3413453 | 10/1985 | Fed. Rep. of Germany ...... 297/220 |
| 59-136540 | 8/1984 | Japan .................. 297/391 |
| 61-119293 | 6/1986 | Japan .................. 297/391 |

*Primary Examiner*—Kenneth J. Dorner
*Assistant Examiner*—James M. Gardner
*Attorney, Agent, or Firm*—Sughrue, Mion, Zinn, Macpeak & Seas

[57] ABSTRACT

The headrest for a seat backrest, especially of a motor vehicle consists inter alia, of a U-shaped frame (10) with an inner part (101) and an outer part (102), a cushion (20), for example annular, in which the inner part (101) of the frame (10) is housed and an outside covering (30) enclosing the cushion (20); it is characterised in that the cushion (20) is made of a closed-cell foam with a density of approximately between 20 g/l and 300 g/l and is obtained by moulding and in that the covering (30) has a surface film (31) and an underlayer (32), is made of a foam with a density of approximately between 100 g/l and 1000 g/l, on which (32) this surface film (31) is autoformed, and is obtained by overmoulding.

10 Claims, 1 Drawing Sheet

HEADREST WITH CLOSED CELL CUSHION AND A COVERING HAVING AN AUTO FORMED SURFACE FILM AND OVERMOULDED UNDERLAYER

BACKGROUND OF THE INVENTION

The present invention relates to seats for a vehicle, and most especially for a land motor vehicle, and in particular to headrests, especially annular ones.

Headrests for a seat backrest, especially of a motor vehicle, comprising, inter alia, for example a U-shaped frame with an inner part and an outer part, a cushion, for example annular, in which the inner part of the frame is housed and an outside covering enclosing the cushion, are known. Some headrests of this type which are currently on the market comprise, in particular, a cushion made of a polyurethane foam and obtained by injection moulding. Cushions of this kind are not wholly satisfactory, especially insofar as the occupants, safety is concerned.

As is known, public authorities have laid down standards to which the vehicle manufacturers must conform and headrests with the cushions of the type just referred to are not wholly satisfactory; in fact, they are not entirely efficient in contributing to the absorption of energy which may be necessary in the event of a relatively major impact. Polyurethane foam is usually employed, although not entirely satisfactorily from the viewpoint of safety, but its price is relatively modest.

SUMMARY OF THE INVENTION

The invention is aimed at overcoming this type of disadvantage by acting so that not only the occupants' safety is improved, but that their comfort is also increased.

The subject matter of the invention is a headrest for a seat backrest, especially of a motor vehicle, comprising inter alia, a U-shaped frame with an inner part and an outer part, a cushion in which the inner part of the frame is housed and an outside covering enclosing the cushion. This headrest is characterised especially in that the cushion is made of a closed-cell foam with a density of approximately between 20 g/l and 300 g/l and is obtained by moulding and in that the covering has a surface film and an underlayer, is made of a foam with a density of approximately between 100 g/l and 1000 g/l, on which this surface film is autoformed, and is obtained by moulding.

Other characteristics of the invention will emerge on reading the description and the claims which follow and on examining the figures of the drawing, which is given solely by way of example, in which:

DESCRIPTION OF THE PREFERRED EMBODIMENTS

Figure 1:
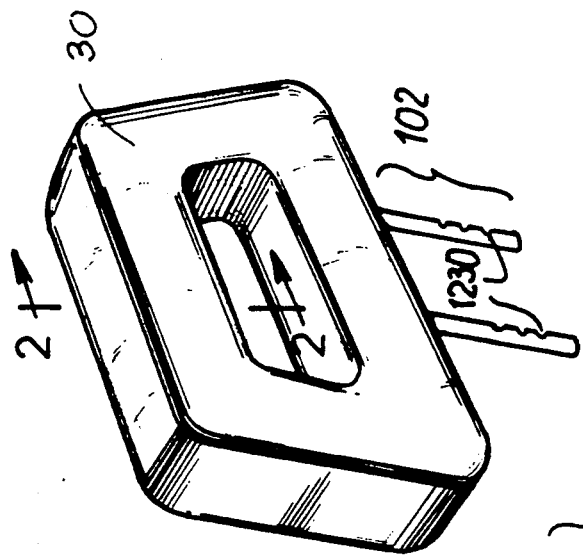
FIG. 1 is a perspective view of an embodiment of a headrest according to the invention.

Since headrests for seats and in particular for seats of a land motor vehicle are well known in the art, as are processes for their manufacture, only what directly or indirectly concerns the invention will be described in what follows. As far as the rest is concerned, the skilled man in the art in question will rely on the common conventional solutions at his or her disposal in order to confront the particular problems facing him or her.

In what follows, the same reference number always identifies a homologous component, whatever the embodiment.

For the sake of convenience of description, the various constituents of a headrest according to the invention will be described in succession.

As can be seen by examining the various figures of the drawing, a headrest according to the invention comprises, inter alia, a frame 10, a cushion 20 and an outside covering 30.

Figure 3:
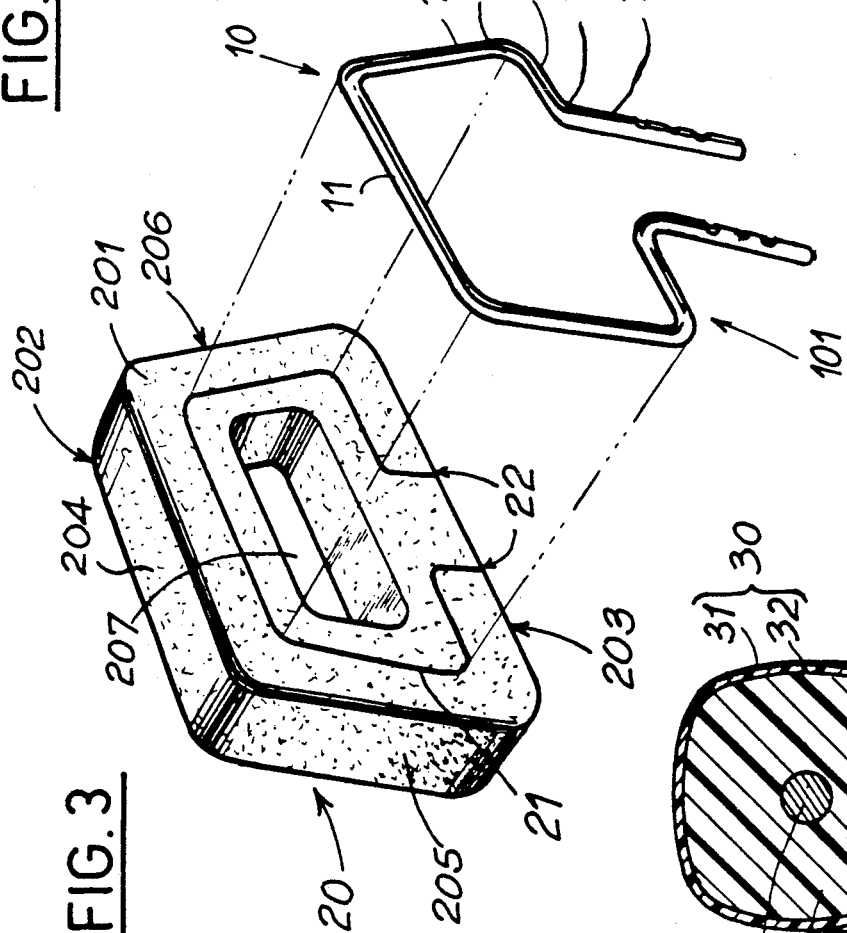
FIG. 3 is an exploded partial perspective view of the embodiment of FIG. 1.

The frame 10, preferably U-shaped, comprises a bridge 11 which connects two side branches 12. Each of the branches 12 is made up of a segment 121, a bar 122 at right angles and a leg 123. As can be seen in particular in FIG. 3, the segment 121 is connected to the bridge 11 so as to be approximately perpendicular to the latter at each of its ends. The bar 122 at right angles is connected, on the one hand, to the segment 121 by a bend 124 and, on the other hand, to the leg 123 by a reverse bend 125. As can be seen, the bridge 11, the segments 121 and the bars 122 form the inner part 101 of the frame. The legs 123 with, if need be, a part of the reverse bend 125 form the outer part 102 of the frame. As can be seen, the inner part 101 and the outer part 102 are in planes which are preferably slightly inclined relative to each other.

The cushion 20 has a configuration which is, for example, annular and approximately parallelepiped or prismatic, as illustrated. This cushion is defined, by two faces 201 and 202, two bases in the form of a bottom 203 and a top 204, and two sides 205 and 206. A central opening 207 passes through the faces 201 and 202 so as to obtain the annular configuration if the latter is adopted. In the case of the embodiment illustrated, the face 201 is provided with a slot 21 the configuration of which is that of the inner part 101 of the frame 10. This slot 21 opens onto the bottom 203 by orifices 22 to allow the outer part 102 of the frame 10 to pass through. As can be noted from FIG. 2, the depth of this slot is such that the inner part 101 of the frame, when placed in position, is housed essentially approximately at mid-thickness of the cushion 20. If appropriate, depending upon the thickness of manufacture, the bottom of the slot 21 is provided with a receptacle 23 which makes it easier to install the inner part 101 of the frame.

Figure 2:
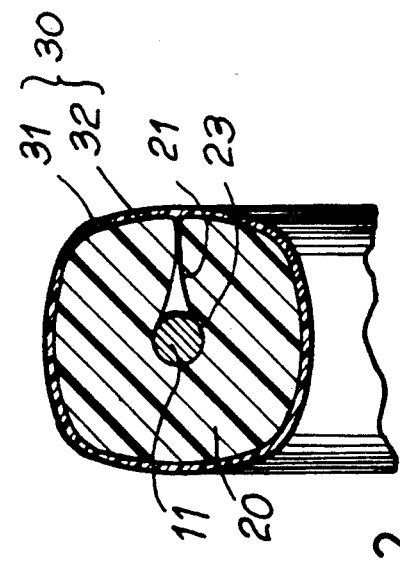
FIG. 2 is a partial section along the line 2—2 of FIG. 1.

The covering 30 has a surface film 31 and an underlayer 32, as can be noted especially in the section of FIG. 2.

The frame 10, solid or hollow, is preferably metallic. The legs 123 preferably carry notches 1230 or the like, intended to permit the adjustment of the position of the headrest when it is used in combination with a seat backrest.

The cushion 20 is made of a closed-cell foam with a density of approximately between 20 g/l and 300 g/l. This foam is obtained by moulding. Polyethylene or polypropylene pearls or granules, which may be expanded, are preferably employed to obtain this foam. Materials which are particularly suited for the manufacture of such a cushion are sold commercially, for example under the name "Eperan" by Kaneka Belgium N.V. or the name "Neopolen P" by BASF or "Ethafoam" by Dow Chemical and "Arpro" by ARCO Chemical. These materials are processed by moulding, for example in a metal mould.

The covering 30 is made of a polyurethane foam with a density of approximately between 100 g/l and 1000 g/l. This covering is obtained by overmoulding so that the surface layer 31 is autoformed and that the thickness of the covering is of the order of b 3 to 5 mm. (The term "autoformed" has the same meaning as "self-skinned" found in U.S. Pat. No. 4,880,275 to Lanteri. That is, the covering 30 is obtained by a second molding operation so that the surface layer 31 is formed through a self skinning process and so that the thickness of the covering is of the order 3 to 5 mm.).

The materials employed for manufacturing the cushion, which have closed cells or pores have good elastic properties which endow them with flexibility and a good elastic memory after a dynamic stress. This elasticity contributes to an appreciable shock absorption and to a shape recovery after distortion, while exhibiting a low residual distortion under a continuous load. In addition to these properties, these materials have a very good capacity for energy absorption which, of course, promotes safety.

According to one method of manufacture, the cushion is moulded separately with a slot 21 as indicated above.

To make the safety conditions complete, the slot 21 is made on the face 201 which is that intended to receive indirectly the pressure of the head of an occupant. Such a location of the slot makes it further possible to absorb more energy in the event of impact, since not only the impact energy resulting from the pressure of the head is absorbed by the foam, but also by the tendency of the frame to being dislodged.

Figure 4:
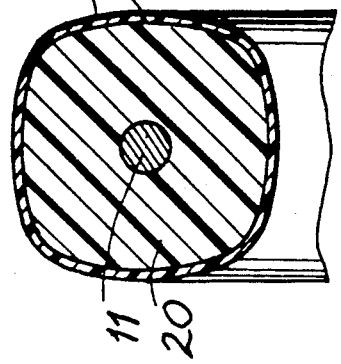
FIG. 4 is a partial sectional view, similar to FIG. 2, showing another embodiment according to the invention.

According to another method of manufacture, the frame is placed in the mould which is used to make the cushion and the latter is moulded onto the inner part of the frame, which thus acts as a trapped part or insert as shown in cross-section in FIG. 4.

Whichever of the two methods indicated is employed, the covering is overmoulded so as to give the headrest its final external appearance directly.

The small angle formed by the inner part and the outer part is a function especially of the method of attachment of the frame to a backrest and of the slope of the latter.

All the advantages provided by a headrest according to the invention, both where safety and comfort are concerned, are understood from the preceding description.

What is claimed is:

1. Headrest for a seat backrest, especially of a motor vehicle, comprising: a U-shaped frame (10) with an inner part (101) and an outer part (102); and
    a cushion (20) in which the inner part (101) of the frame (10) is housed and an outside covering (30) enclosing the cushion (20);
    wherein the cushion (20) is made of a closed-cell foam with a density of approximately between 20 g/l and 300 g/l and is obtained by moulding;
    wherein the covering (30) has a surface film (31) and an underlayer (32), is made of a foam with a density of approximately between 100 g/l and 1000 g/l, and is obtained by overmoulding, and wherein the surface film (31) is autoformed on the underlayer (32);
    wherein the inner part (101) of the frame (10) is housed, adhesive-free, essentially approximately at mid-thickness of the cushion (20); and
    wherein the cushion (20) is moulded onto the inner part (101) of the frame (10).

2. Headrest for a seat backrest, especially of a motor vehicle, comprising:
    a U-shaped frame (10) with an inner part (101) and an outer part (102);
    a cushion (20) in which the inner part (101) of the frame (10) is housed; and
    an outside covering (30) enclosing the cushion (20);
    wherein the cushion (20) is made of a closed-cell foam with a density of approximately between 20 g/l and 300 g/l and is obtained by moulding;
    wherein the covering (30) has a surface film (31) and an underlayer (32), is made of a foam with a density of approximately between 100 g/l and 1000 g/l, and is obtained by overmoulding, and wherein the surface film (31) is autoformed on the underlayer (32);
    wherein the inner part (101) of the frame (10) is movably housed, adhesive-free, essentially approximately at mid-thickness of the cushion (20);
    wherein the cushion (20) is defined by two faces (201, 202), a bottom (203), a top (204) and two sides (205, 206);
    wherein one (201) of the faces (201, 202) is provided with a slot (21) having a configuration which is that of the inner part (101) of the frame (10) and opening onto the bottom (203) via orifices (22) to allow the outer part (102) of the frame (10) to pass through the bottom (203);
    wherein the movably housed inner part (101) of the frame (10) is free to move along said slot (21) when the head of an occupant applies pressure to the cushion (20) in response to an impact; and
    wherein the face (201) provided with the slot (21) is that intended to receive indirectly the head of an occupant.

3. Headrest according to claim 2, characterised in that the frame (10) is engaged by force in the slot (21).

4. Headrest according to claim 2, characterised in that the U-shaped frame (10) comprises a bridge (11) and two branches (12), each made up of a segment (121), a bar (122) at right angles and a leg (123) where this segment (121) is connected to this bridge (11), this bar (122) is connected, on the one hand, to this segment (121) by a bend (124) and, on the other hand, to this leg (123) by a reverse bend (125) so that these bridge (11), segments (121) and bars (122) form the inner part (101) and these legs (123) the outer part (102), these inner (101) and outer (102) parts being in planes which are slightly inclined relative to each other.

5. Headrest according to claim 2, characterised in that the frame (10) is solid.

6. Headrest according to claim 2, characterised in that the frame (10) is hollow.

7. Headrest according to claim 8 or 9, characterised in that the frame (10) is metallic.

8. Headrest according to claim 2, characterised in that the cushion (20) is made of polyethylene foam.

9. Headrest according to claim 2, characterised in that the cushion (20) is made of polypropylene foam.

10. Headrest according to claim 2, characterised in that the cushion (20) is annular and pierced by a central opening (207).

* * * * *